(12) United States Patent
Lee et al.

(10) Patent No.: US 11,748,305 B2
(45) Date of Patent: Sep. 5, 2023

(54) SUGGESTING A DESTINATION FOLDER FOR A FILE TO BE SAVED

(71) Applicant: International Business Machines Corporation, Armonk, NY (US)

(72) Inventors: Sunhwan Lee, Menlo Park, CA (US); Shun Jiang, San Jose, CA (US); Robert J. Moore, San Jose, CA (US); Guangjie Ren, Belmont, CA (US); Raphael I. Arar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/334,430

(22) Filed: May 28, 2021

(65) Prior Publication Data

US 2021/0286763 A1    Sep. 16, 2021

Related U.S. Application Data

(63) Continuation of application No. 16/206,556, filed on Nov. 30, 2018, now Pat. No. 11,093,447.

(51) Int. Cl.
| | | |
|---|---|---|
| *G06F 16/14* | (2019.01) | |
| *G06F 16/16* | (2019.01) | |
| *G06F 40/205* | (2020.01) | |
| *G06F 40/284* | (2020.01) | |

(52) U.S. Cl.
CPC .......... *G06F 16/156* (2019.01); *G06F 16/148* (2019.01); *G06F 16/16* (2019.01); *G06F 40/205* (2020.01); *G06F 40/284* (2020.01)

(58) Field of Classification Search
CPC ...... G06F 16/156; G06F 16/16; G06F 16/148; G06F 40/284; G06F 40/205
USPC ........................................................ 707/828
See application file for complete search history.

(56) References Cited

U.S. PATENT DOCUMENTS

| | | | |
|---|---|---|---|
| 7,039,642 B1 | 5/2006 | Horvitz et al. | |
| 7,899,831 B2 | 3/2011 | Drory et al. | |
| 8,473,532 B1* | 6/2013 | Ben .......................... | G06F 16/13 |
| | | | 707/831 |
| 9,286,304 B2 | 3/2016 | Taljanovic | |
| 9,805,042 B1* | 10/2017 | Meyer ................... | G06F 16/358 |
| 11,093,447 B2 | 8/2021 | Lee et al. | |
| 2007/0067353 A1 | 3/2007 | Cheng et al. | |
| 2009/0248615 A1* | 10/2009 | Drory ..................... | G06F 16/16 |

(Continued)

OTHER PUBLICATIONS

"MailCat: An intelligent assistant for organizing e-mail," Segal et al., Proceedings of the Third Annual Conference on Autonomous Agents, ACM, 1999, pp. 276-282.*

(Continued)

*Primary Examiner* — Giovanna B Colan
(74) *Attorney, Agent, or Firm* — Zilka-Kotab, P.C.

(57) ABSTRACT

A computer-implemented method according to one embodiment includes determining a starting folder within a file system, computing, for each child folder of the starting folder, a similarity metric indicating a level of similarity to a file, selecting two child folders of the starting folder having greatest similarity metrics, comparing a difference between the greatest similarity metrics of the two child folders to a predetermined threshold, and conditionally selecting the starting folder as a recommended folder to which the file is saved, based on the comparing.

20 Claims, 7 Drawing Sheets

(56) References Cited

U.S. PATENT DOCUMENTS

| | | | | |
|---|---|---|---|---|
| 2009/0249255 | A1* | 10/2009 | Haustein | G06F 16/16 715/840 |
| 2010/0257217 | A1* | 10/2010 | Warren | G06F 16/16 707/822 |
| 2011/0119628 | A1 | 5/2011 | Carter et al. | |
| 2011/0264764 | A1* | 10/2011 | Kewalramani | H04W 4/16 709/217 |
| 2014/0310279 | A1* | 10/2014 | Taljanovic | G06F 16/285 707/737 |
| 2018/0113586 | A1 | 4/2018 | Arar et al. | |
| 2020/0034447 | A1* | 1/2020 | Lapointe | G06F 16/13 |
| 2020/0174967 | A1 | 6/2020 | Lee et al. | |

OTHER PUBLICATIONS

Woitsch et al., "Graphical Evolution Tool," Sixth Framework Programme, Dec. 30, 2005, 67 pages.

Chang et al., "Download Assistant: An Adaptive Approach for Folder Predicting," Project Report for CPSC 532C User Adaptive Interaction, Apr. 27, 2011, pp. 1-16.

Segal et al., "MailCat: An intelligent assistant for organizing e-mail," Proceedings of the Third Annual Conference on Autonomous Agents, ACM, 1999, pp. 276-282.

Bao et al., "FolderPredictor: Reducing the Cost of Reaching the Right Folder," ACM Transactions on Intelligent Systems and Technology, vol. 1, No. 1, May 2010, pp. 1-22.

Bao et al., "Fewer Clicks and Less Frustration: Reducing the Cost of Reaching the Right Folder," IUI'06, Jan. 29-Feb. 1, 2006, 8 pages.

Arar et al., U.S. Appl. No. 15/334,185, filed Oct. 25, 2016.

U.S. Appl. No. 16/022,490, filed Jun. 28, 2018.

Lee et al., U.S. Appl. No. 16/206,556, filed Nov. 30, 2018.

Non-Final Office Action from U.S. Appl. No. 16/206,556, dated Dec. 4, 2020.

Notice of Allowance from U.S. Appl. No. 16/206,556, dated Apr. 12, 2021.

IBM, List of IBM Patents Or Patent Applications Treated As Related, dated Jun. 16, 2021, 2 pages.

\* cited by examiner

SUGGESTING A DESTINATION FOLDER FOR A FILE TO BE SAVED

BACKGROUND

The present invention relates to file system management, and more specifically, this invention relates to determining a suggested destination folder for a file to be saved within a file system.

The creation, editing, and saving of files is a common occurrence in modern computing. Determining and suggesting an accurate destination folder for a created file may improve the productivity and efficiency of daily interactions between users and file systems.

SUMMARY

A computer-implemented method according to one embodiment includes determining a starting folder within a file system, computing, for each child folder of the starting folder, a similarity metric indicating a level of similarity to a file, selecting two child folders of the starting folder having greatest similarity metrics, comparing a difference between the greatest similarity metrics of the two child folders to a predetermined threshold, and conditionally selecting the starting folder as a recommended folder to which the file is saved, based on the comparing.

According to another embodiment, a computer program product is provided that includes one or more computer readable storage media, and program instructions collectively stored on the one or more computer readable storage media, where the program instructions include instructions configured to cause one or more processors to perform a method including determining a starting folder within a file system, utilizing the one or more processors; computing, for each child folder of the starting folder, a similarity metric indicating a level of similarity to the file, utilizing the one or more processors; selecting two child folders of the starting folder having greatest similarity metrics, utilizing the one or more processors; comparing a difference between the greatest similarity metrics of the two child folders to a predetermined threshold, utilizing the one or more processors; and conditionally selecting, utilizing the one or more processors, the starting folder as a recommended folder to which the file is saved, based on the comparing.

According to another embodiment, a system includes a processor, and logic integrated with the processor, executable by the processor, or integrated with and executable by the processor, where the logic is configured to determine a starting folder within a file system; compute, for each child folder of the starting folder, a similarity metric indicating a level of similarity to a file; select two child folders of the starting folder having greatest similarity metrics, including comparing a value for the similarity metric for each of the child folders of the starting folder, and identifying two child folders of the starting folder having a similarity metric greater than similarity metrics of the remaining child folders, wherein a larger similarity metric indicates a greater level of similarity to the file; compare a difference between the greatest similarity metrics of the two child folders to a predetermined threshold; and conditionally select the starting folder as a recommended folder to which the file is saved, based on the comparison.

Other aspects and embodiments of the present invention will become apparent from the following detailed description, which, when taken in conjunction with the drawings, illustrate by way of example the principles of the invention.

DETAILED DESCRIPTION

Figure 1:
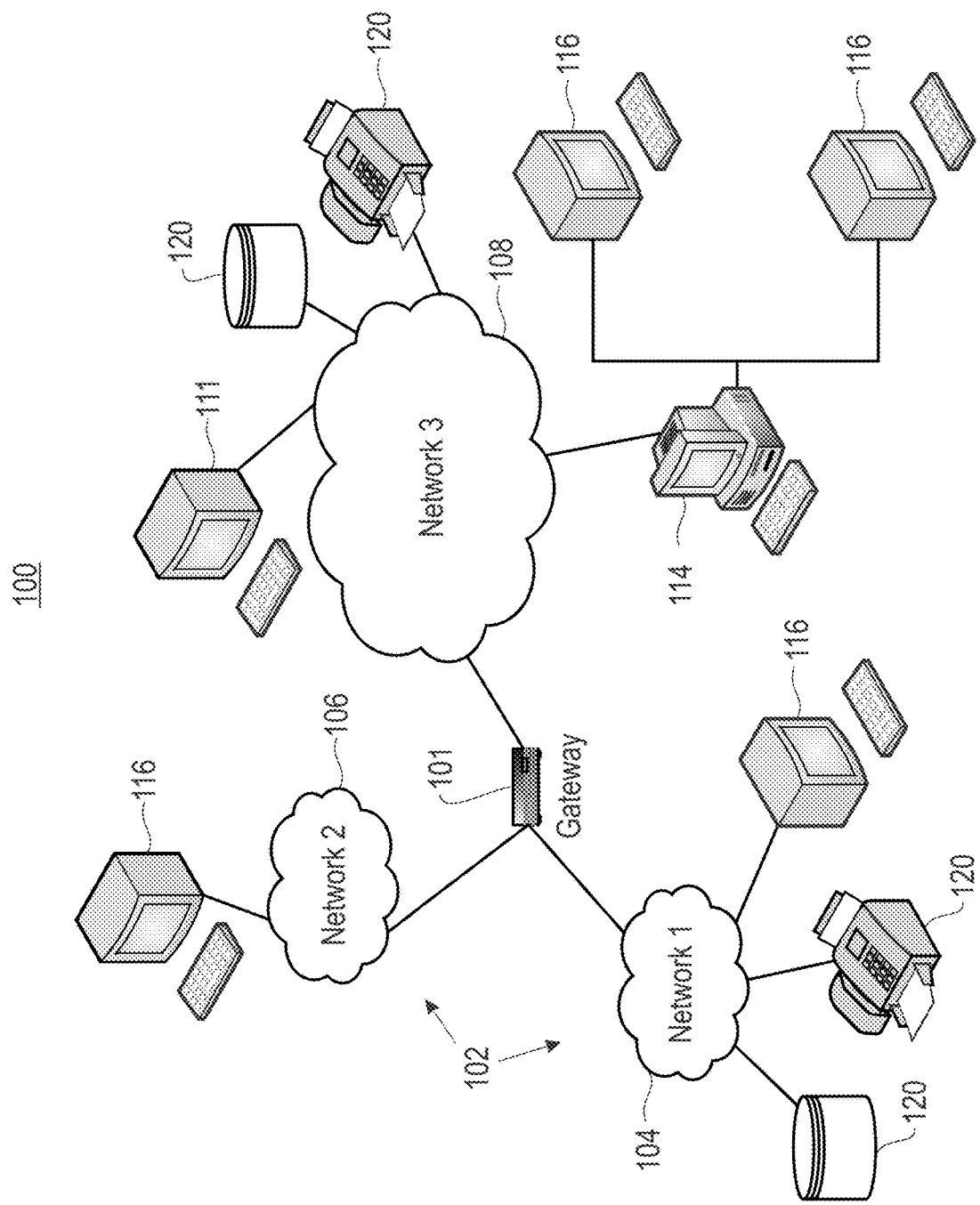
FIG. 1 illustrates a network architecture, in accordance with one embodiment.

The following description discloses several preferred embodiments of systems, methods and computer program products for suggesting a destination folder for a file to be saved. Various embodiments provide a method to compare a language model for a file to a language model of a folder to determine a similarity metric between the folder and the file, and selecting a destination folder based on an evaluation of similarity metrics for various files.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for suggesting a destination folder for a file to be saved.

In one general embodiment, a computer-implemented method includes determining a starting folder within a file system, computing, for each child folder of the starting folder, a similarity metric indicating a level of similarity to a file, selecting two child folders of the starting folder having greatest similarity metrics, comparing a difference between the greatest similarity metrics of the two child folders to a predetermined threshold, and conditionally selecting the starting folder as a recommended folder to which the file is saved, based on the comparing.

In another general embodiment, a computer program product for suggesting a destination folder for a file to be saved includes a computer readable storage medium having program instructions embodied therewith, wherein the computer readable storage medium is not a transitory signal per se, and where the program instructions are executable by a processor to cause the processor to perform a method including determining a starting folder within a file system, utilizing the processor, computing, for each child folder of the starting folder, a similarity metric indicating a level of similarity to the file, utilizing the processor, selecting two child folders of the starting folder having greatest similarity metrics, utilizing the processor, comparing a difference between the greatest similarity metrics of the two child folders to a predetermined threshold, utilizing the processor, and conditionally selecting, utilizing the processor, the starting folder as a recommended folder to which the file is saved, based on the comparing.

In another general embodiment, a system includes a processor, and logic integrated with the processor, executable by the processor, or integrated with and executable by the processor, where the logic is configured to determine a starting folder within a file system, compute, for each child folder of the starting folder, a similarity metric indicating a level of similarity to a file, select two child folders of the starting folder having greatest similarity metrics, compare a difference between the greatest similarity metrics of the two child folders to a predetermined threshold, and conditionally select the starting folder as a recommended folder to which the file is saved, based on the comparison.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
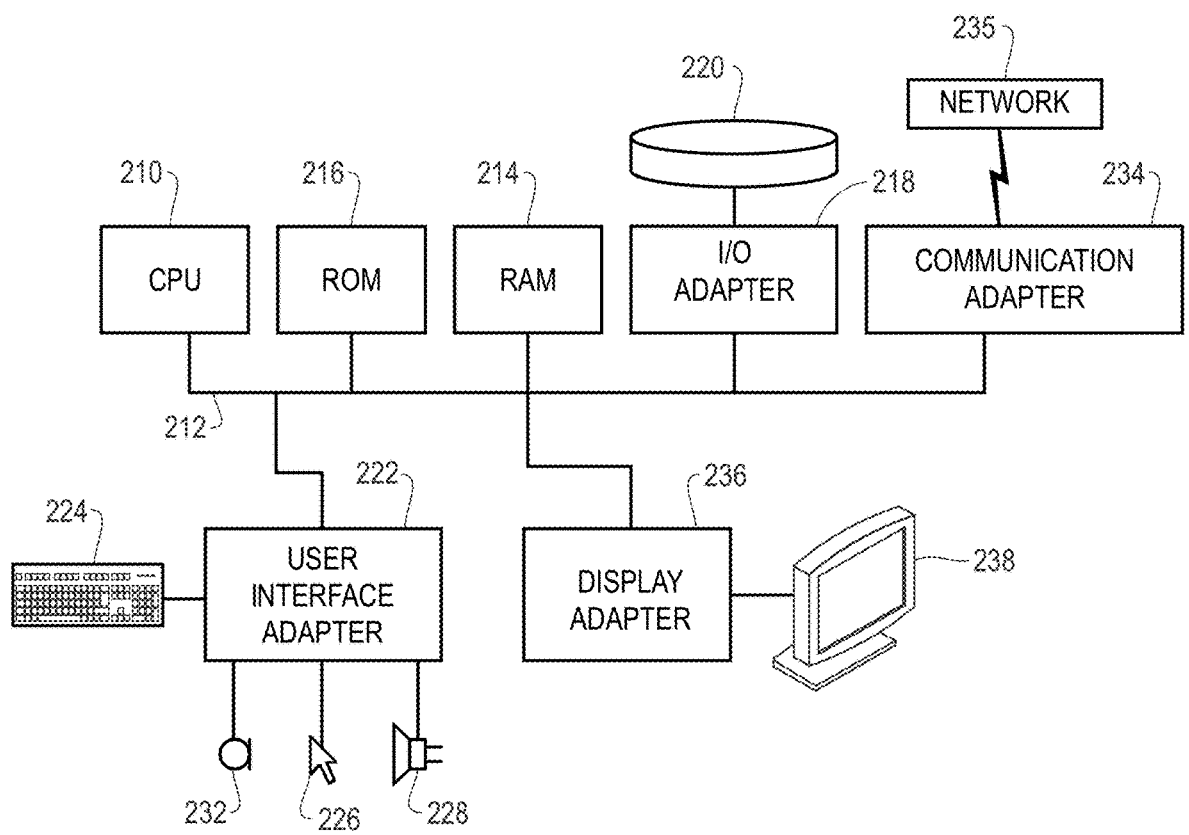
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
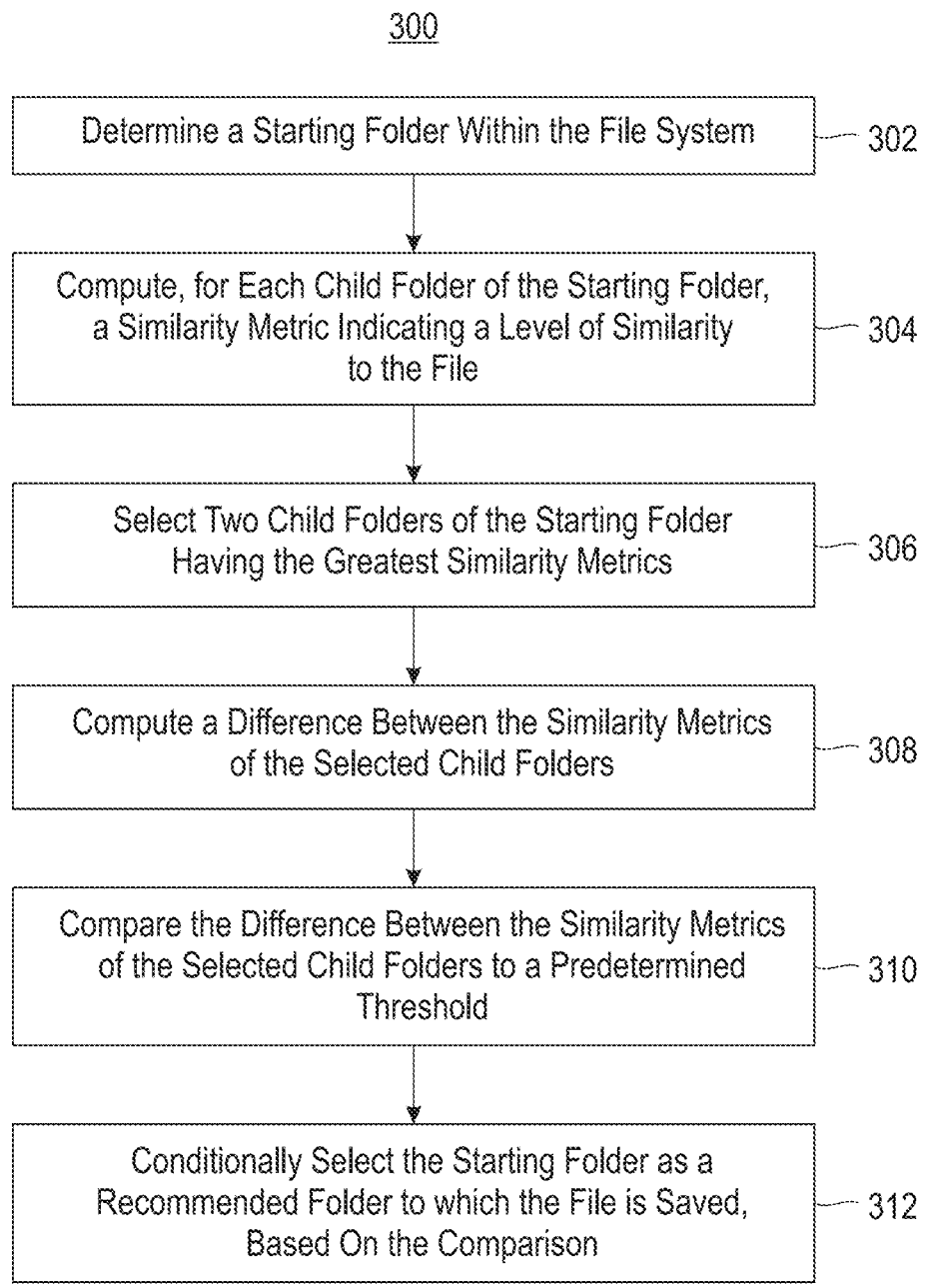
FIG. 3 illustrates a method for suggesting a destination folder for a file to be saved, in accordance with one embodiment.

Now referring to FIG. 3, a flowchart of a method 300 is shown according to one embodiment. The method 300 may be performed in accordance with the present invention in any of the environments depicted in FIGS. 1-2 and 6, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a starting folder within the file system is determined. In one embodiment, the starting folder may be determined in response to identifying a request to save a file within a file system. For example, the file may include a file that is currently open within an application. In another example, the file may include a new file that has not yet been explicitly saved by a user within the file system. For instance, the user may create a new file, edit the new file, and request to save the new file within the file system (e.g., by selecting a save command within a graphical user interface (GUI), etc.).

Additionally, in one embodiment, the file system may include a means to store and retrieve data within a computing device. For example, the file system may include one or more methods and/or data structures used by an operating system of a computing device to store and retrieve data.

Further, in one embodiment, the starting folder may include an initial folder used as a starting point for comparison to the file. In another embodiment, the starting folder may be determined based on contextual information. For example, the contextual information may include a location associated with the saving of the file (e.g., a current location of a user and/or computing device that is requesting the saving of the file). In another example, the contextual information may include a time associated with the saving of the file (e.g., a current time, etc.).

Further still, in one example, the contextual information may include an application used associated with the saving of the file (e.g., an application used to create, edit, and/or save the file, etc.). In another example, the contextual information may include a device associated with the saving of the file (e.g., a current device used during the creation, editing, and/or saving of the file, etc.). In yet another example, the contextual information may include a network associated with the saving of the file (e.g., a current network used during the creation, editing, and/or saving of the file, etc.). In still another example, the contextual information may include a user associated with the saving of the file (e.g., a user ID of a current user implementing the creation, editing, and/or saving of the file, etc.).

Also, in one embodiment, the contextual information may be compared to historical contextual information in order to determine the starting folder. For example, e.g., the historical contextual information may include contextual information for starting folders selected in previous iterations. In another example, the historical contextual information may be compared to the current historical information to identify historical contextual information that most closely matches the current historical information when compared to all of the historical contextual information. In yet another example, a folder associated with historical contextual information that most closely matches the current historical information may be selected as the starting folder.

In addition, in one embodiment, the starting folder may include a top-most folder within a file system (e.g., a folder with no parent folders, etc.). In another embodiment, the starting folder may be manually selected by a user.

Furthermore, method 300 may proceed with operation 304, where for each child folder of the starting folder, a similarity metric indicating a level of similarity to the file is computed. In one embodiment, upon determining that the starting folder has only a single child folder, the single child folder may be selected as the updated starting folder, and its children folders may be identified. For example, this process may be repeated until a starting folder having multiple child folders is identified.

Further still, in one embodiment, the similarity metric may be computed by comparing a language model created for the file to a language model created for each child folder. For example, the language model may be created for the file in response to request to save a file within a file system. In another example, the language model may be created for each child folder according to a predetermined schedule or other predetermined criteria (e.g., in response to changes made within the folder, etc.).

Also, in one embodiment, the language model for each child folder may be stored as metadata for the child folder. In another embodiment, for each child folder, the similarity metric may include a numerical value indicating a level of similarity between the child folder and the file. For example, for each child folder, the similarity may include a value indicating number of matching words between a language model for the child folder and a language model for the file.

Additionally, method 300 may proceed with operation 306, where two child folders of the starting folder having the greatest similarity metrics are selected. In one embodiment, a value for the similarity metric for each of the child folders may be compared, and two child folders having a similarity metric greater than the similarity metrics of the remaining child folders may be identified. In another embodiment, a larger similarity metric may indicate a greater level of similarity to the file.

Further, method 300 may proceed with operation 308, where a difference between the similarity metrics of the selected child folders is computed. In one embodiment, a difference between the similarity metrics of the two child folders of the starting folder having the greatest similarity metrics may be determined. For example, after selecting the two child folders of the starting folder that have similarity metrics with the greatest value, a difference may be determined between the values of the similarity metrics for the two selected child folders. This difference may include a numerical value indicating the difference between a similarity metric for the first child folder and a similarity metric for the second child folder.

Further still, method 300 may proceed with operation 310, where the difference between the similarity metrics of the selected child folders is compared to a predetermined threshold. In one embodiment, the predetermined threshold may include a threshold numerical value determined by a user.

Also, method 300 may proceed with operation 312, where the starting folder is conditionally selected as a recommended folder to which the file is saved, based on the comparison. In one embodiment, upon determining that the difference between the similarity metrics of the selected child folders is less than the predetermined threshold, the starting folder may be selected as the recommended folder to which the file is saved, and may be presented to a user as a recommended path to save the file (e.g., via a GUI, etc.). In another embodiment, upon determining that the difference between the similarity metrics of the selected child folders is greater than or equal to the predetermined threshold, a child folder having the greatest similarity metric may be selected as a new starting folder, and the method may start over using the new starting folder.

In this way, the file system may be analyzed, beginning with the starting folder, in order to determine a folder that is most relevant to the file to be saved. This folder may be selected and presented as a suggested destination folder for the file. This may increase a relevancy of suggested destination folders for a file to be saved, and may reduce an amount of file system navigation performed by the user while saving a file. By reducing an amount of file system navigation performed within a system during a save, an amount of necessary computing resources allocated to such system navigation may be reduced, which may improve a performance of a computing device performing the saving of the file.

Figure 4:
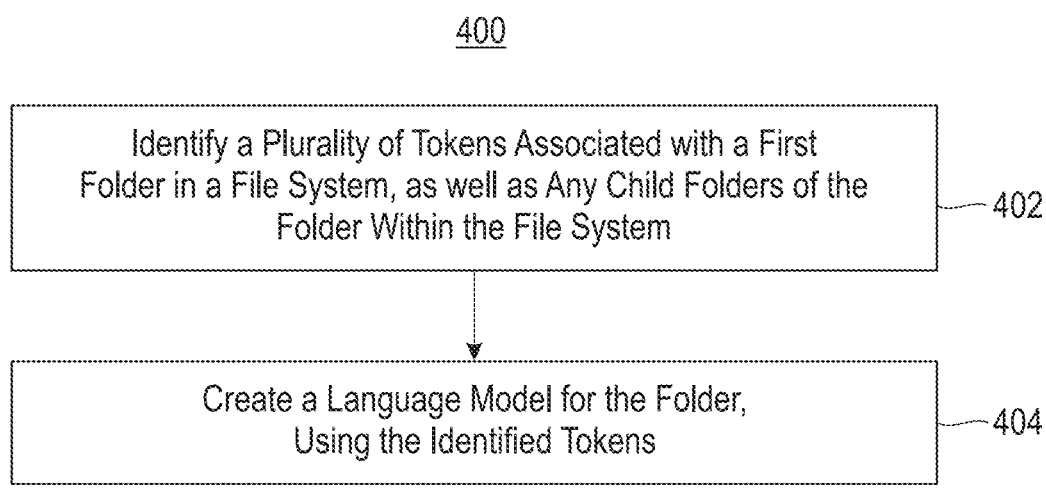
FIG. 4 illustrates a method for creating a language model for a folder within a file system, in accordance with one embodiment.

Now referring to FIG. 4, a flowchart of a method 400 for creating a language model for a folder within a file system is shown according to one embodiment. The method 400 may be performed in accordance with the present invention in any of the environments depicted in FIGS. 1-2 and 6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of tokens associated with a first folder within a file system, as well as any child folders of the folder within the file system, are identified. In one embodiment, the first folder may include an entity within a file system used as a storage location for one or more files. For example, first folder may be included within a hierarchy of folders within the file system used for the storage of files. In another example, the first folder may be represented as a file path within the file system.

Additionally, in one embodiment, the child folders may include all folders located (e.g., stored) within the first folder within the file system. In another embodiment, the child folders may include all folders having the first folder as a parent within a folder hierarchy of the file system. In yet another embodiment, the tokens may include alphanumeric terms/words such as a name of the folder, names of all files within the folder, names of all children folders for the folder, etc.

Further, in one embodiment, the tokens may include alphanumeric terms found within metadata associated with the folder and children folders of the folder. In another embodiment, the tokens may include the alphanumeric contents of the files within the folder and the children folders of the folder. For example, the files may be parsed to determine all words within the files.

Further still, method 400 may proceed with operation 404, where a language model is created for the folder, using the identified tokens. In one embodiment, the language model may include a bag-of-words model such as a list, an array, etc. In another embodiment, the language model may include all of the identified tokens associated with the folder. In yet another embodiment, all of the identified tokens may be aggregated to create the model for the folder. In still another embodiment, the model may include a count for each of the identified tokens, where the count is representative of a number of instances of the associated token within the folder and child folders.

Also, in one embodiment, the model may include a word embedding model (e.g., a word2vec model, etc.) that produces a vector space by applying the identified tokens to one or more neural networks trained to reconstruct linguistic contexts of words. In another embodiment, the language model for a folder may be updated periodically (e.g., according to a schedule, in response to one or more changes within the folder, etc.). In another embodiment, the language model for a folder may be stored as metadata associated with the folder.

Figure 5:
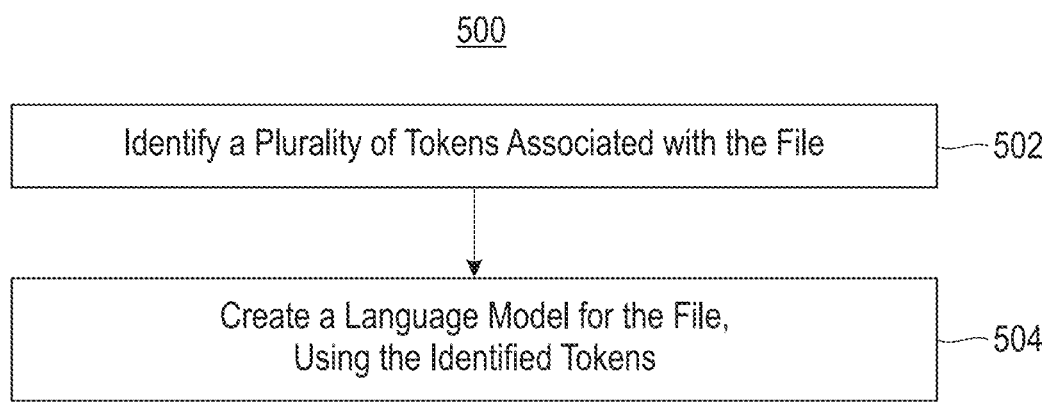
FIG. 5 illustrates a method for creating a language model for a file to be saved within a file system, in accordance with one embodiment.

Now referring to FIG. 5, a flowchart of a method 500 for creating a language model for a file to be saved within a file system is shown according to one embodiment. The method 500 may be performed in accordance with the present invention in any of the environments depicted in FIGS. 1-2 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of tokens associated with a file are identified. In one embodiment, the tokens may include alphanumeric terms/words such as a name of the file, one or more words within the file, alphanumeric terms found within metadata associated with the folder, etc. For example, the file may be parsed to determine all words within the file.

Additionally, method 500 may initiate with operation 504, where a language model is created for the file, using the identified tokens. In one embodiment, the language model may include a bag-of-words model such as a list, an array, etc. In another embodiment, the language model may be created for the file in a similar manner to how the language model is created for each of the folders within the file system, as shown in FIG. 4.

Figure 6:
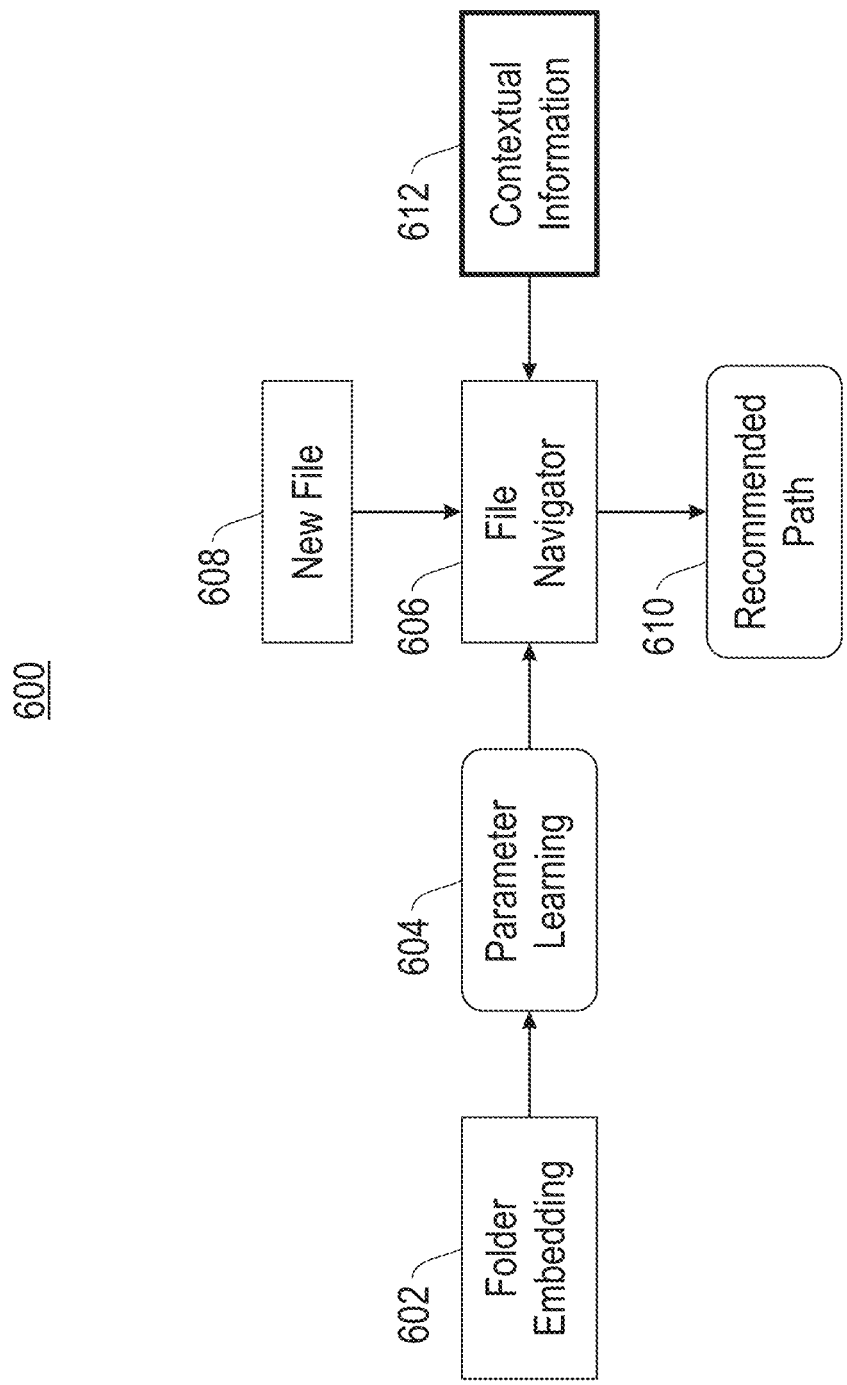
FIG. 6 illustrates an exemplary path recommendation workflow, in accordance with one embodiment.

FIG. 6 illustrates an exemplary path recommendation workflow 600, according to one exemplary embodiment. As shown, a folder embedding module 602 creates a language model (e.g., a bag-of-words model, etc.) for each folder within a file system. Additionally, a parameter learning module 604 determines a threshold based on a structure of the file system and an analysis of underlying files within the file system.

Figure 7:
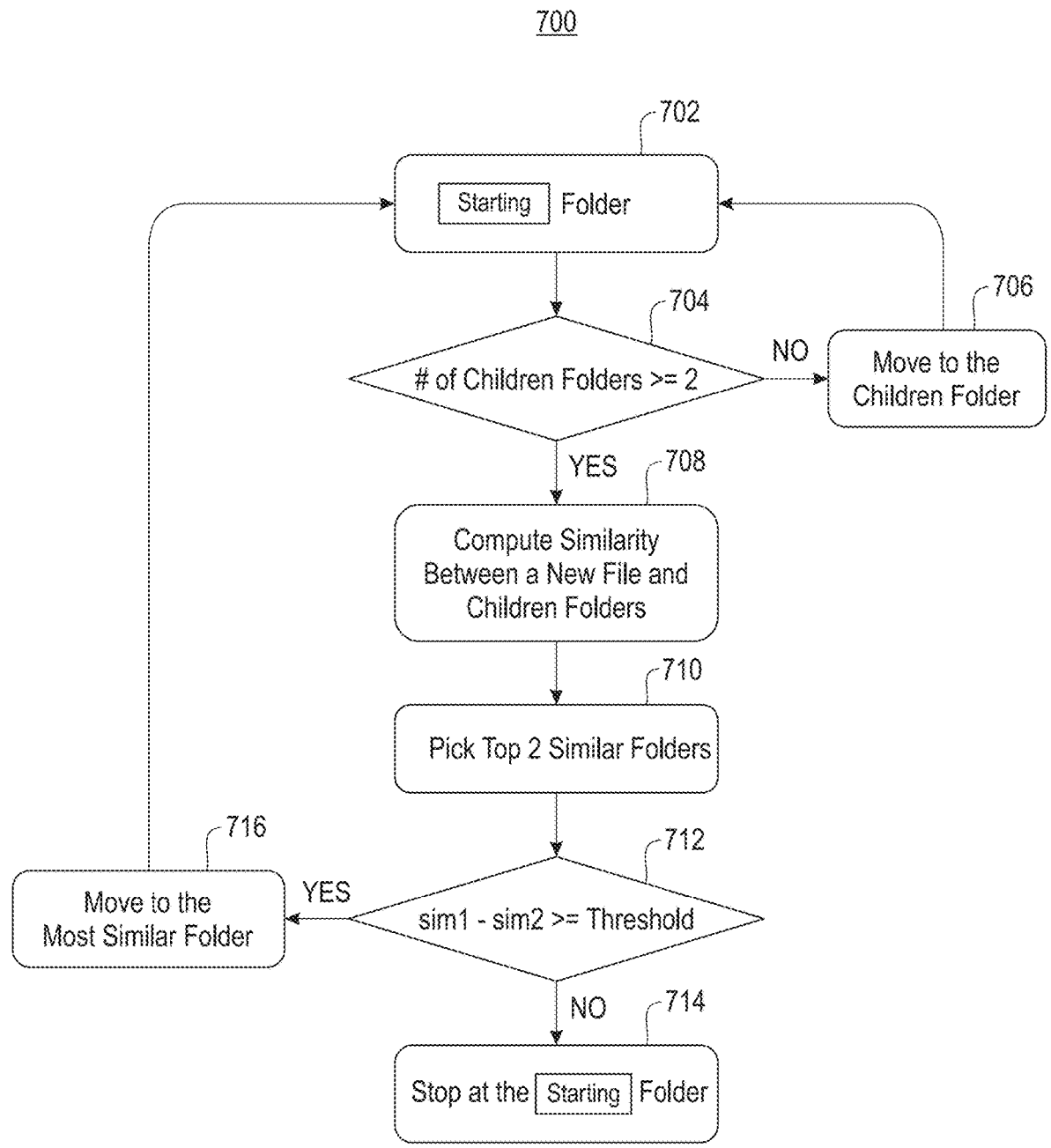
FIG. 7 illustrates a method for implementing a file navigator, in accordance with one embodiment.

For example, the parameter learning module 604 may implement one or more supervised machine learning algorithms (e.g., neural networks, etc.) that take the structure of the file system and one or more characteristics of underlying files within the file system as input, and determine a threshold to be used when comparing computed similarities for the selected folders (e.g., the threshold used in at least FIG. 3 and FIG. 7).

In another example, the parameter learning module 604 may perform a grid search by dividing the threshold between zero and one into different groups and determining a computed practical measure from a test data set, and may use the threshold that gives the minimum practical measure from the test data set. This threshold determined by the parameter learning module 604 may maximize an accuracy of a folder identified and recommended as relevant to a new file to be stored.

Additionally, in one embodiment, a file navigator module 606 may identify a new file 608 to be saved, and may create a language model for the file. The file navigator module 606 may then compare the language model to one or more language models for folders within the file system to determine similarity metrics (see, for example, at least FIG. 3 and FIG. 7), and may compare a difference between similarity metrics to the threshold obtained from the parameter learning module 604 (see, for example, at least FIG. 3 and FIG. 7) in order to determine a recommended path (e.g., a recommended starting folder, etc.).

Further, in one embodiment, contextual information 612 may be provided to the file navigator module 606 in order to assist with the determination of a recommended path. For example, the contextual information 612 may be used by the file navigator module 606 in order to determine a starting folder for performing language model comparisons (see at least FIG. 3).

Now referring to FIG. 7, a flowchart of a method 700 for implementing a file navigator is shown according to one embodiment. The method 700 may be performed in accordance with the present invention in any of the environments depicted in FIGS. 1-2 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a current folder is determined within a file system. In one embodiment, the starting folder may be determined in response to identifying a request to save a new file within a file system. In another embodiment, the starting folder may include an initial folder used as a starting point for comparison to the new file. In yet another embodiment, the starting folder may be determined based on contextual information.

Additionally, method 700 may proceed with decision 704, where it is determined whether the starting folder has two or more children folders. If it is determined in decision 704 that the starting folder does not have two or more children folders, method 700 may proceed with operation 706, where a single child folder of the starting folder is set as the starting folder and the method 700 starts over at operation 702. In one embodiment, upon determining that the starting folder contains no children folders, the starting folder may be selected as a recommended folder to save the new file.

Further, if it is determined in decision 704 that the starting folder has two or more children folders, then method 700 may proceed with operation 708, where a similarity is computed between the new file to be saved and each of the children folders. In one embodiment, the similarity may include a similarity metric that is computed by comparing a language model created for the new file to a language model created for each child folder.

Further still, method 700 may proceed with operation 710, where the two children folders with the greatest computed similarity are selected, and method 700 may proceed with decision 712, where it is determined whether the difference between the computed similarities for the selected two children folders is greater than or equal to a threshold. If it is determined in decision 712 that the difference between the computed similarities for the selected two children folders is less than the threshold, then method 700 may proceed with operation 714, where the starting folder is selected as a recommended folder to save the new file.

Also, if it is determined in decision 712 that the difference between the computed similarities for the selected two children folders is greater than or equal to the threshold, then method 700 may proceed with operation 716, where one of the selected two children folders having the greatest computed similarity is set as the starting folder and the method 700 starts over at operation 702.

In this way, a folder may be identified and recommended as relevant to the new file, while avoiding a need for a user to backtrack within the file system to parent folders of the recommended folder.

In this way, a path for saving files may be recommended using a language model and contextual information in order to make daily interactions with files more productive. In one embodiment, folder embedding may be performed by applying a language model to tokens found in underlying file names. In another embodiment, the language model may include a bag-of-words model.

Additionally, in one embodiment, folder embedding may be an additive and aggregative process from children folders to parent folders. In another embodiment, a similarity may be computed between a file to save and a starting folder. A threshold for the termination criteria may be learned using a grid search. A hierarchical folder structure may be navigated until a termination condition is encountered, and a recommended path may be exposed by adaptively configuring a user interface.

In another embodiment, contextual information may be collected, and a model to predict working folders may be built. Additionally, a starting folder may be determined by aggregating a probability of children folders until a folder is found whose aggregated probability is greater than a threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   determining a starting folder within a file system;
   computing, for each child folder of the starting folder, a similarity metric indicating a level of similarity to a file;
   selecting two child folders of the starting folder having greatest similarity metrics;
   comparing a difference between the greatest similarity metrics of the two child folders to a predetermined threshold; and
   conditionally selecting the starting folder as a recommended folder to which the file is saved, based on the comparing.

2. The computer-implemented method of claim 1, comprising selecting one of the two child folders having the greatest similarity metric in response to determining that the difference between the greatest similarity metrics of the two child folders is greater than the predetermined threshold.

3. The computer-implemented method of claim 1, wherein the starting folder is determined based on contextual information, the contextual information including:
   a location associated with a saving of a file,
   a time associated with the saving of the file,
   an application used associated with the saving of the file,
   a device associated with the saving of the file,
   a network associated with the saving of the file, and
   a user associated with the saving of the file.

4. The computer-implemented method of claim 1, wherein the starting folder includes a top-most folder within a file system.

5. The computer-implemented method of claim 1, comprising selecting the starting folder as a recommended folder to which the file is saved in response to determining that the difference between the greatest similarity metrics of the two child folders is less than the predetermined threshold; and outputting a path to the starting folder as a recommended path to save the file in response to selection of the starting folder as the recommended folder to which the file is saved.

6. The computer-implemented method of claim 1, further comprising, in response to determining that the starting folder has only a single child folder, selecting the single child folder as an updated starting folder.

7. The computer-implemented method of claim 1, wherein the similarity metric is computed by comparing a language model created for a file to a language model created for each child folder of the starting folder.

8. The computer-implemented method of claim 1, wherein each child folder of the starting folder includes a language model stored as metadata for the child folder.

9. The computer-implemented method of claim 1, wherein for each child folder of the starting folder, the similarity metric includes a numerical value indicating a level of similarity between the child folder and a file.

10. The computer-implemented method of claim 1, wherein selecting the two child folders of the starting folder having the greatest similarity metrics includes:
    comparing a value for the similarity metric for each of the child folders of the starting folder, and
    identifying two child folders of the starting folder having a similarity metric greater than similarity metrics of the remaining child folders,
    wherein a larger similarity metric indicates a greater level of similarity to the file.

11. The computer-implemented method of claim 1, further comprising creating a language model for each child folder of the starting folder, including for each child folder:
    identifying as tokens all words within files within the child folder, all words within any additional child folders of the child folder, and all terms within metadata associated with the child folder and any additional child folders of the child folder, and
    aggregating all of the tokens to create a language model for the child folder,
    where the language model includes a count for each of the tokens that is representative of a number of instances of the token within the child folder and any additional child folders of the child folder;
    wherein the similarity metric is computed by comparing the language model created for the file to the language model for each child folder.

12. A computer program product comprising one or more computer readable storage media, and program instructions collectively stored on the one or more computer readable storage media, the program instructions comprising instructions configured to cause one or more processors to perform a method comprising:
    determining a starting folder within a file system, utilizing the one or more processors;
    computing, for each child folder of the starting folder, a similarity metric indicating a level of similarity to a file, utilizing the one or more processors;
    selecting two child folders of the starting folder having greatest similarity metrics, utilizing the one or more processors;
    comparing a difference between the greatest similarity metrics of the two child folders to a predetermined threshold, utilizing the one or more processors;
    conditionally selecting, utilizing the one or more processors, the starting folder as a recommended folder to which the file is saved, based on the comparing; and
    outputting a path to the starting folder as a recommended path to save the file in response to selection of the starting folder as the recommended folder to which the file is saved.

13. The computer program product of claim 12, wherein the method includes selecting one of the two child folders having the greatest similarity metric in response to determining that the difference between the greatest similarity metrics of the two child folders is greater than the predetermined threshold.

14. The computer program product of claim 12, wherein the starting folder is determined based on contextual information, the contextual information selected from a group consisting of:
- a location associated with a saving of a file,
- a time associated with the saving of the file,
- an application used associated with the saving of the file,
- a device associated with the saving of the file,
- a network associated with the saving of the file, and
- a user associated with the saving of the file.

15. The computer program product of claim 12, wherein the starting folder includes a top-most folder within a file system.

16. The computer program product of claim 12, comprising selecting the starting folder as a recommended folder to which the file is saved in response to determining that the difference between the greatest similarity metrics of the two child folders is less than the predetermined threshold.

17. The computer program product of claim 12, further comprising, in response to determining that the starting folder has only a single child folder, selecting the single child folder as an updated starting folder.

18. The computer program product of claim 12, wherein the similarity metric is computed by comparing a language model created for a file to a language model created for each child folder of the starting folder.

19. The computer program product of claim 12, wherein each child folder of the starting folder includes a language model stored as metadata for the child folder.

20. A system, comprising:
- a processor; and
- logic integrated with the processor, executable by the processor, or integrated with and executable by the processor, the logic being configured to:
- determine a starting folder within a file system;
- compute, for each child folder of the starting folder, a similarity metric indicating a level of similarity to a file, the child folders being folders located within the starting folder within the file system and/or folders having the starting folder as a parent within a folder hierarchy of the file system;
- select two child folders of the starting folder having greatest similarity metrics, including:
  - comparing a value for the similarity metric for each of the child folders of the starting folder, and
  - identifying two child folders of the starting folder having a similarity metric greater than similarity metrics of the remaining child folders,
  - wherein a larger similarity metric indicates a greater level of similarity to the file;
- compare a difference between the greatest similarity metrics of the two child folders to a predetermined threshold; and
- select one of the two child folders having the greatest similarity metric as a new starting folder in response to determining that the difference between the greatest similarity metrics of the two child folders is greater than the predetermined threshold;
- repeat the computing, selecting and comparing the difference for two child folders of the new starting folder;
- select the new starting folder as a recommended folder to which the file is saved in response to determining that the difference between the greatest similarity metrics of the two child folders of the new starting folder is less than the predetermined threshold; and
- output a path to the new starting folder as a recommended path to save the file in response to selection of the new starting folder as the recommended folder to which the file is saved.

* * * * *